(12) United States Patent
Shedletsky et al.

(10) Patent No.: US 9,602,914 B2
(45) Date of Patent: Mar. 21, 2017

(54) PORTING AUDIO USING A CONNECTOR IN A SMALL FORM FACTOR ELECTRONIC DEVICE

(75) Inventors: Anna-Katrina Shedletsky, Sunnyvale, CA (US); Adam D. Mittleman, San Francisco, CA (US); Fletcher R. Rothkopf, Los Altos, CA (US); Phillip M. Hobson, Menlo Park, CA (US); Eric S. Jol, San Jose, CA (US); Stephen Brian Lynch, Portola Valley, CA (US); Douglas J. Weber, Arcadia, CA (US)

(73) Assignee: Apple Inc., Cupertino, CA (US)

( * ) Notice: Subject to any disclaimer, the term of this patent is extended or adjusted under 35 U.S.C. 154(b) by 634 days.

(21) Appl. No.: 12/950,793

(22) Filed: Nov. 19, 2010

(65) Prior Publication Data
US 2012/0053711 A1 Mar. 1, 2012

Related U.S. Application Data

(60) Provisional application No. 61/377,866, filed on Aug. 27, 2010.

(51) Int. Cl.
*H04R 1/02* (2006.01)
*H04R 25/00* (2006.01)
(Continued)

(52) U.S. Cl.
CPC ........... *H04R 1/2834* (2013.01); *H04R 1/403* (2013.01); *H04R 11/02* (2013.01); *H04N 5/642* (2013.01);
(Continued)

(58) Field of Classification Search
CPC ........ H04R 11/00; H04R 11/02; H04R 17/00; H04R 1/42; H04R 23/00; H04R 23/004;
(Continued)

(56) References Cited

U.S. PATENT DOCUMENTS

| 4,074,419 A | 2/1978 | Hanni et al. |
| 5,045,971 A | 9/1991 | Ono et al. |

(Continued)

FOREIGN PATENT DOCUMENTS

| CN | 2757458 | 2/2002 |
| CN | 1361970 | 7/2002 |

(Continued)

OTHER PUBLICATIONS

Office Action dated Oct. 25, 2010 in CN Application No. 201020179389.8.
(Continued)

*Primary Examiner* — Duc Nguyen
*Assistant Examiner* — Sean H Nguyen
(74) *Attorney, Agent, or Firm* — Kilpatrick Townsend & Stockton LLP

(57) ABSTRACT

An integrated audible sound output system incorporated in a personal media device is described. The integrated audible sound output system includes a first audio output port, the first audio output port acoustically coupled with the audible sound generator unit by way of a first air path and a second audio output port. In the described embodiments, the second audio output port is acoustically coupled with the audible sound generator unit by way of a second air path. The first and the second air paths cooperate to pass the audible sound generated by the audible sound generator unit to the external environment by way of the first audio port and the second audio port.

15 Claims, 10 Drawing Sheets

(51) Int. Cl.
| | |
|---|---|
| *H04B 3/00* | (2006.01) |
| *H04R 1/28* | (2006.01) |
| *H04R 1/40* | (2006.01) |
| *H04R 11/02* | (2006.01) |
| *H04R 23/00* | (2006.01) |
| *H04R 17/00* | (2006.01) |
| *H04R 1/24* | (2006.01) |
| *H04R 11/00* | (2006.01) |
| *H04R 1/42* | (2006.01) |
| *H04N 5/64* | (2006.01) |
| *H04R 5/02* | (2006.01) |

(52) U.S. Cl.
CPC ............... *H04R 1/245* (2013.01); *H04R 1/42* (2013.01); *H04R 5/02* (2013.01); *H04R 11/00* (2013.01); *H04R 17/00* (2013.01); *H04R 23/00* (2013.01); *H04R 23/004* (2013.01); *H04R 2499/11* (2013.01); *H04R 2499/15* (2013.01)

(58) Field of Classification Search
CPC ...... H04R 5/02; H04R 2499/15; H04R 1/025; H04R 1/403; H04N 5/642
USPC .................... 381/162, 165, 387, 388; 310/81
See application file for complete search history.

(56) References Cited

U.S. PATENT DOCUMENTS

| | | | |
|---|---|---|---|
| 5,128,829 A | 7/1992 | Loew | |
| 5,180,644 A | 1/1993 | Bresin et al. | |
| 5,468,947 A | 11/1995 | Danielson et al. | |
| 5,517,574 A * | 5/1996 | Tichy | 381/386 |
| 5,568,358 A | 10/1996 | Nelson et al. | |
| 5,737,183 A | 4/1998 | Kobayashi et al. | |
| 5,784,256 A | 7/1998 | Nakamura et al. | |
| 5,796,575 A | 8/1998 | Podwalny et al. | |
| 6,038,328 A | 3/2000 | Hsu | |
| 6,064,894 A * | 5/2000 | Zurek et al. | 455/569.1 |
| 6,137,890 A | 10/2000 | Markow | |
| 6,144,368 A | 11/2000 | Ooka et al. | |
| 6,153,834 A | 11/2000 | Cole et al. | |
| 6,208,521 B1 | 3/2001 | Nakatsuka | |
| 6,408,171 B1 | 6/2002 | Schuelke et al. | |
| 6,427,017 B1 | 7/2002 | Toki | |
| 6,434,407 B1 | 8/2002 | Cook | |
| 6,452,811 B1 | 9/2002 | Tracy et al. | |
| 6,536,589 B2 | 3/2003 | Chang | |
| 6,746,797 B2 | 6/2004 | Benson et al. | |
| 6,757,157 B2 | 6/2004 | Lammintaus et al. | |
| 6,781,824 B2 | 8/2004 | Krieger et al. | |
| 6,819,946 B2 | 11/2004 | Hansson | |
| 6,838,810 B1 | 1/2005 | Bovio et al. | |
| 6,847,522 B2 | 1/2005 | Fan et al. | |
| 6,929,879 B2 | 8/2005 | Yamazaki | |
| 7,110,536 B2 * | 9/2006 | Hampton et al. | 379/433.02 |
| 7,149,557 B2 | 12/2006 | Chadha | |
| 7,190,802 B2 | 3/2007 | Rains et al. | |
| 7,236,357 B2 | 6/2007 | Chen | |
| 7,297,439 B2 | 11/2007 | Yamazaki et al. | |
| 7,352,584 B1 | 4/2008 | Sung | |
| 7,412,267 B2 | 8/2008 | Eaton et al. | |
| 7,432,860 B2 | 10/2008 | Huynh | |
| 7,515,431 B1 | 4/2009 | Zadesky et al. | |
| 7,553,055 B2 | 6/2009 | Liu | |
| 7,558,054 B1 | 7/2009 | Prest et al. | |
| 7,558,057 B1 | 7/2009 | Naksen et al. | |
| 7,558,396 B2 | 7/2009 | Liu et al. | |
| 7,564,424 B2 | 7/2009 | Umchara | |
| 7,583,987 B2 | 9/2009 | Park | |
| 7,620,175 B2 | 11/2009 | Black et al. | |
| 7,663,607 B2 | 2/2010 | Hotelling et al. | |
| 7,668,332 B2 | 2/2010 | Williams et al. | |
| 7,688,574 B2 | 3/2010 | Zadesky et al. | |
| 7,697,281 B2 | 4/2010 | Dabov et al. | |
| 8,666,332 B2 * | 3/2014 | Yamaguchi et al. | 455/90.3 |
| 2002/0102870 A1 | 8/2002 | Burns et al. | |
| 2002/0107044 A1 | 8/2002 | Kuwata et al. | |
| 2002/0114143 A1 | 8/2002 | Morrison et al. | |
| 2003/0003945 A1 | 1/2003 | Saiki et al. | |
| 2003/0081392 A1 | 5/2003 | Cady et al. | |
| 2004/0062388 A1 * | 4/2004 | MacDonald et al. | 379/433.03 |
| 2004/0084244 A1 | 5/2004 | Zurek et al. | |
| 2004/0203518 A1 | 10/2004 | Zheng et al. | |
| 2005/0014537 A1 | 1/2005 | Gammon et al. | |
| 2005/0085871 A1 * | 4/2005 | Pufulescu et al. | 607/57 |
| 2005/0088778 A1 | 4/2005 | Chen et al. | |
| 2005/0095745 A1 | 5/2005 | Sapir | |
| 2006/0067070 A1 | 3/2006 | Otsuki | |
| 2006/0157842 A1 | 7/2006 | Goodwin | |
| 2006/0198547 A1 * | 9/2006 | Hampton et al. | 381/395 |
| 2006/0262500 A1 | 11/2006 | Huang et al. | |
| 2007/0058821 A1 | 3/2007 | Welsh et al. | |
| 2007/0081303 A1 | 4/2007 | Lam et al. | |
| 2007/0160228 A1 | 7/2007 | Yang et al. | |
| 2008/0025547 A1 | 1/2008 | Yun et al. | |
| 2008/0037765 A1 | 2/2008 | Finney et al. | |
| 2008/0037770 A1 | 2/2008 | Emmert | |
| 2008/0062660 A1 | 3/2008 | Weber et al. | |
| 2008/0069384 A1 | 3/2008 | Kim et al. | |
| 2008/0101026 A1 | 5/2008 | Ali | |
| 2008/0165139 A1 | 7/2008 | Hotelling et al. | |
| 2008/0165485 A1 | 7/2008 | Zadesky et al. | |
| 2008/0266774 A1 | 10/2008 | Tracey et al. | |
| 2008/0307144 A1 * | 12/2008 | Minoo | G06F 1/1632 710/304 |
| 2008/0316116 A1 | 12/2008 | Hobson et al. | |
| 2008/0316121 A1 | 12/2008 | Hobson et al. | |
| 2009/0015510 A1 | 1/2009 | Nakata et al. | |
| 2009/0049773 A1 | 2/2009 | Zadesky et al. | |
| 2009/0059485 A1 | 3/2009 | Lynch et al. | |
| 2009/0067141 A1 | 3/2009 | Dabov et al. | |
| 2009/0137268 A1 * | 5/2009 | Fukazawa et al. | 455/556.1 |
| 2009/0155681 A1 | 6/2009 | Lin et al. | |
| 2009/0160712 A1 | 6/2009 | Breiter et al. | |
| 2009/0185045 A1 * | 7/2009 | Rosenblatt et al. | 348/222.1 |
| 2009/0201652 A1 | 8/2009 | Chew et al. | |
| 2009/0245564 A1 | 10/2009 | Mittleman et al. | |
| 2009/0257189 A1 | 10/2009 | Wang et al. | |
| 2009/0257613 A1 | 10/2009 | Khamashta et al. | |
| 2009/0302804 A1 | 12/2009 | Park et al. | |
| 2010/0008040 A1 | 1/2010 | Weber et al. | |
| 2010/0073247 A1 | 3/2010 | Arkko et al. | |
| 2010/0328250 A1 * | 12/2010 | Gorsica et al. | 345/174 |
| 2011/0164767 A1 * | 7/2011 | Goel | G06F 1/1688 381/182 |
| 2013/0045782 A1 * | 2/2013 | Simmer | 455/575.8 |
| 2013/0048413 A1 * | 2/2013 | Patzer | 181/199 |
| 2013/0114844 A1 * | 5/2013 | Fukazawa et al. | 381/387 |
| 2013/0136289 A1 * | 5/2013 | Goel et al. | 381/334 |

FOREIGN PATENT DOCUMENTS

| | | |
|---|---|---|
| CN | 1471337 | 1/2004 |
| CN | 1706231 | 12/2005 |
| CN | 2779773 | 5/2006 |
| CN | 1863222 | 11/2006 |
| CN | 1870676 | 11/2006 |
| CN | 101464701 | 6/2009 |
| CN | 101622884 | 1/2010 |
| CN | 101682986 | 3/2010 |
| CN | 202218360 | 5/2012 |
| DE | 10252308 | 4/2004 |
| EP | 0534290 | 3/1993 |
| EP | 1209880 | 2/2002 |
| EP | 1257147 | 11/2002 |
| EP | 1441489 | 7/2004 |
| EP | 1 732 230 A2 | 12/2006 |
| EP | 1870956 | 12/2007 |
| EP | 2343872 | 7/2011 |
| GB | 2137425 | 10/1984 |
| JP | 023582 | 1/1998 |
| JP | 2003-11194 | 4/2003 |
| JP | 2004-213498 | 7/2004 |

(56) References Cited

FOREIGN PATENT DOCUMENTS

| JP | 2005130156 A | 5/2005 |
|---|---|---|
| JP | 2006-311324 | 9/2006 |
| KR | 20070047650 A | 5/2007 |
| WO | WO 2008/152438 | 12/2008 |
| WO | WO 2009/056143 | 5/2009 |

OTHER PUBLICATIONS

Notice of Allowance dated Sep. 3, 2010 in U.S. Appl. No. 12/205,826.
Office Action dated Jul. 12, 2010 in U.S. Appl. No. 12/205,826.
Ho et al., "Cost Effective Integrated Housing and Printed Circuit Module for Battery Pack," ip.com Prior Art Database, Apr. 29, 2004, 6 pgs.
U.S. Appl. No. 12/859,694, filed Aug. 19, 2010.
U.S. Appl. No. 12/859,702, filed Aug. 19, 2010.
U.S. Appl. No. 12/859,711, filed Aug. 19, 2010.
U.S. Appl. No. 12/859,701, filed Aug. 19, 2010.
U.S. Appl. No. 12/859,712, filed Aug. 19, 2010.
Office Action dated Sep. 30, 2009 in U.S. Appl. No. 12/205,824.
Notice of Allowance dated Dec. 21, 2009 in U.S. Appl. No. 12/205,824.
Evaluation Report for Utility Model Patent ZL2009201775365 dated May 28, 2010.
Canadian Office Action for 2,735,999 dated Sep. 12, 2011.
Japanese Office Action for 2011-526076 dated Sep. 9, 2011.
Australian Examiner's First Report for 2011203145 dated Aug. 25, 2011.
Chinese Office Action for 201020179389.8 dated Feb. 16, 2011.
International Search Report for PCT/US2009/050879 dated Dec. 27, 2010.
Written Opinion for PCT/US2009/050879 dated Dec. 27, 2010.
European Office Action for 09790546.7 dated Dec. 21, 2011.
Office Action for U.S. Appl. No. 12/712,900 dated Jan. 5, 2012.
Written Opinion for PCT/US2011/048404 dated Feb. 13, 2012.
Notice of Allowance for U.S. Appl. No. 12/712,900 dated Apr. 25, 2012.
International Preliminary Report on Patentability for PCT/US2009/080879 dated Mar. 8, 2011.
Partial Search Report for PCT/US2009/050879 dated Oct. 7, 2010.
International Search Report for PCT/US2011/048404 dated Feb. 13, 2012.
Korean Office Action for KR 10-2011-7021855 dated Feb. 6, 2012.
Japanese Final Office Action for 2011-526076 dated Feb. 22, 2012.
Summons to attend oral proceedings for European application No. 11749066.4, received Jan. 5, 2017, 6 pages.

\* cited by examiner

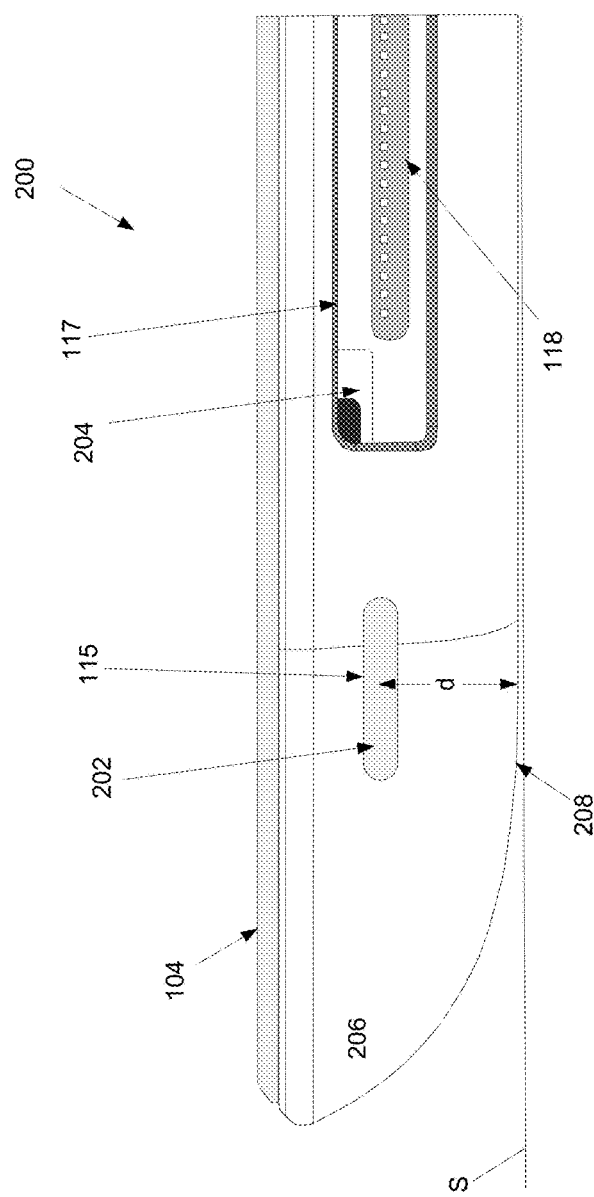
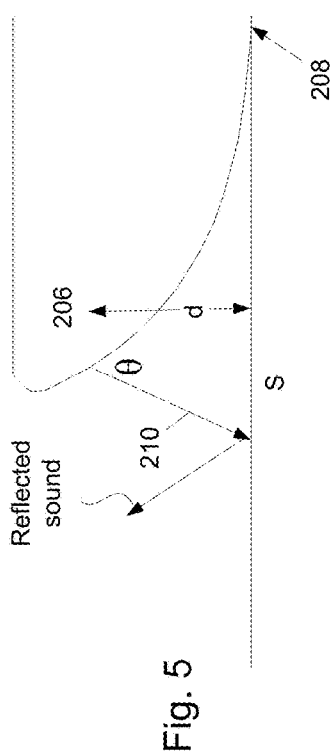
Fig. 4
Fig. 5

PORTING AUDIO USING A CONNECTOR IN A SMALL FORM FACTOR ELECTRONIC DEVICE

CROSS REFERENCE TO RELATED APPLICATIONS

This application claims priority under 35 USC §119 (e) to U.S. Provisional Patent Application No. 61/377,866 filed Aug. 27, 2010 and is hereby incorporated by reference.

This U.S. patent application is related to the following co-pending U.S. patent applications:
(i) "COMPACT FOLDED CONFIGURATION FOR INTEGRATED CIRCUIT PACKAGING" by Rothkopf et al. filed Aug. 19, 2010 having application Ser. No. 12/859,694;
(ii) "INTERNAL FRAME OPTIMIZED FOR STIFFNESS AND HEAT TRANSFER" by Rothkopf et al. filed Aug. 19, 2010 having application Ser. No. 12/859,702
(iii) "COMPOSITE MICROPHONE BOOT TO OPTIMIZE SEALING AND MECHANICAL PROPERTIES" by Rothkopf et al. filed Aug. 19, 2010 having application Ser. No. 12/859,711;
(iv) "MODULAR MATERIAL ANTENNA ASSEMBLY" by Rothkopf et al. filed Aug. 19, 2010 having application Ser. No. 12/859,701; and
(v) "FORMED PCB" by Rothkopf et al. filed Aug. 19, 2010 having application Ser. No. 12/859,712 each of which is incorporated by reference in their entireties for all purposes.

TECHNICAL FIELD

The described embodiments relate generally to small form factor electronic devices. More particularly, efficient utilization of available space within enclosures of the small form factor electronic devices and methods of assembly thereof are discussed.

DESCRIPTION OF THE RELATED ART

The outward appearance of a small form factor electronic device, including its design and its heft can be important factors in determining a user's overall appreciation of the product. For example, the outward appearance and perceived quality of the device functionality can contribute to the overall impression that the user has of the small form factor electronic device. At the same time, the assembly of the small form factor electronic device is also an important consideration as a durable assembly helps to extend the overall life of the small form factor electronic device thereby increasing its value to the user.

One design challenge associated with the small form factor electronic device is the design of the enclosures used to house the various internal components. This design challenge generally arises from a number conflicting design goals that includes the desirability of making the enclosure lighter and thinner, the desirability of making the enclosure stronger and making the enclosure more esthetically pleasing. The lighter enclosures, which typically use thinner plastic structures and fewer fasteners, tend to be more flexible and therefore they have a greater propensity to buckle and bow when used while the stronger and more rigid enclosures, which typically use thicker plastic structures and more fasteners, tend to be thicker and carry more weight. Unfortunately, increased weight can lead to user dissatisfaction, and bowing can damage the internal parts.

In addition to external factors, the small volume within the enclosure available for installation of internal operating components demand that little, if any, of the available internal volume go to waste. On the contrary, as much as possible of the available internal volume must be used in as an efficient manner as possible in keeping with the overall industrial design considerations of the small form factor electronic device. Efficient utilization of the available internal volume becomes ever more crucial due to the increase in number and complexity of the operational components that must be used to provide the ever increasingly complex functionality demanded by users.

Therefore efficient utilization of available space within a small form factor electronic device is desirable.

SUMMARY OF THE DESCRIBED EMBODIMENTS

A personal media device includes at least a housing, the housing having a plurality of openings at least one of which accommodates a housing port arranged to output a first portion of audible energy generated by an audio generator included in the housing and at least another one of which is an alternative port used to broadcast a second portion of the audible energy generated by the audio generator. When at least a portion of the housing port is blocked, then at least some of the first portion of the audible energy is re-directed to the alternative port preserving a perception that an audio output level of the outputted audio energy remains substantially unchanged.

In one aspect of the described embodiment, the alternative port is incorporated into a connector opening in such a way that the alternative port remains substantially unseen by a user of the personal media device. In yet another aspect, the connector opening accommodates a data connector whereas in still another aspect, the connector opening accommodates an audio jack.

A method described in the embodiments can be carried out by performing at least the following operations. Providing a housing, the housing having a size and shape suitable for enclosing a plurality of operational components used to provide functionality for a personal media device, attaching a speaker assembly to an interior of the housing, configuring a first air path acoustically coupling the speaker assembly to the external environment by way of a first audio output port, configuring a second air path between the speaker assembly and a second audio output port independent of the first audio output port such that the first audio output port and the second audio output port are physically located such that when one of the audio output ports is blocked by an object, at least the other audio output port remains unblocked, and cooperatively passing audible sound generated by the speaker assembly to the external environment using the first and the second audio ports.

An integrated audible sound output system incorporated in a personal media device is described. In the described embodiments, the personal media device includes at least a processor, an audio circuit, and a data retention unit that includes at least an audible sound generator unit. The audible sound generator unit is arranged to produce audible sound in accordance with audio data retrieved from the data retention unit, decoded by the audio circuit, and processed by the processor. The integrated audible sound output system includes a first audio output port, the first audio output port acoustically coupled with the audible sound generator unit by way of a first air path. The system also includes a second audio port that is acoustically coupled with the audible sound generator unit by way of a second air path. The first and the second air paths cooperate to pass the audible sound generated by the audible sound generator unit to the external environment by way of the first audio port and the second audio port.

In another embodiment, non-transitory computer readable medium for storing a computer program executed by a processor and used in a computer aided assembly of a personal media device is described. The computer readable medium includes at least computer code for providing a housing, the housing having a size and shape suitable for enclosing a plurality of operational components used to provide functionality for a personal media device, computer code for attaching a speaker assembly to an interior of the housing, computer code for configuring a first air path acoustically coupling the speaker assembly to the external environment by way of a first audio output port, and computer code for configuring a second air path between the speaker assembly and a second audio output port independent of the first audio output port such that first audio output port and the second audio output port are physically located such that when one of the audio output ports is blocked by an object, at least the other audio output port remains unblocked. During operation of the personal media device, the first air path and the second air path cooperatively pass audible sound generated by the speaker assembly to the external environment using the first and the second audio ports.

Other apparatuses, methods, features and advantages of the described embodiments will be or will become apparent to one with skill in the art upon examination of the following figures and detailed description. It is target that all such additional apparatuses, methods, features and advantages be included within this description be within the scope of and protected by the accompanying claims.

BRIEF DESCRIPTION OF THE DRAWINGS

The described embodiments and the advantages thereof can best be understood by reference to the following description taken in conjunction with the accompanying drawings.

FIG. 4 shows an enlarged view of a portion of housing shown in FIG. 2 viewed in a head on perspective.

FIG. 5 is a side view of the portion of the housing shown in FIG. 5 highlighting a relationship between an output audio port and a sound reflecting surface.

DETAILED DESCRIPTION OF REPRESENTATIVE EMBODIMENTS

Figure 1:
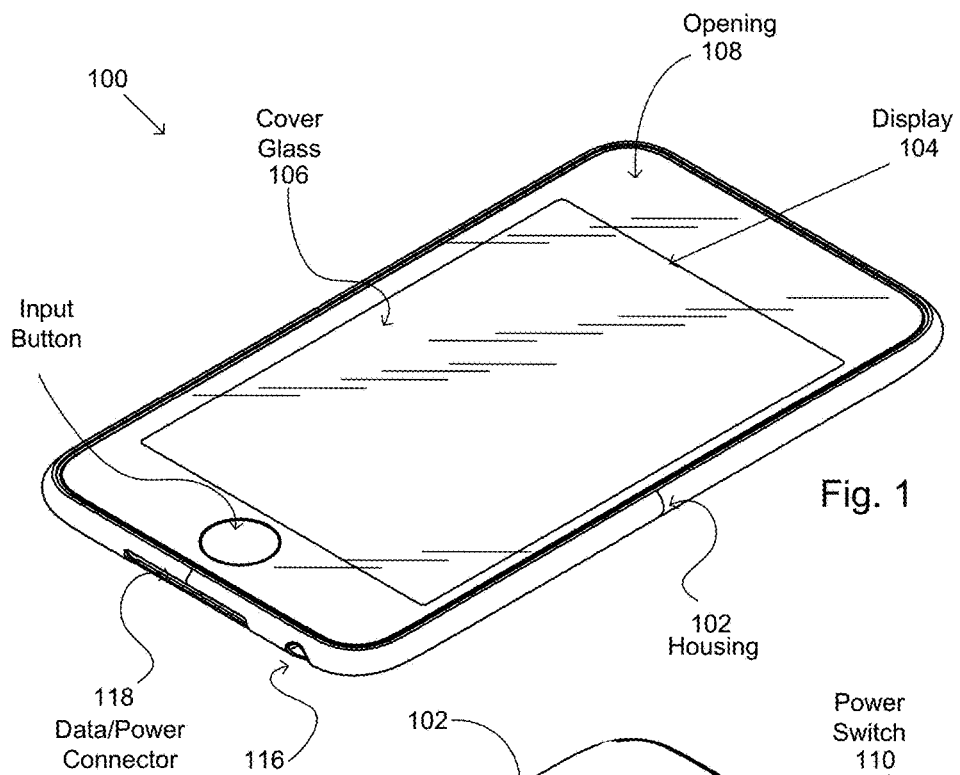
FIGS. 1-2 are perspective diagrams showing various views of fully assembled personal media device in accordance with an embodiment of the invention.

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

Aspects of the described embodiments relate to a small form factor electronic product. For the remainder of this discussion, the small form factor electronic device will be described in terms of a personal media device. The personal media device can include housing suitable for enclosing and supporting various operational components. The housing can support various input/output mechanisms such as volume switches, power buttons, data and power connectors, audio jacks and the like. The housing can include openings to accommodate the input/output mechanisms. The locations at which the input/output mechanisms are placed can be selected to enhance the usability of the interface under conditions for which the device is intended to operate. For instance, for a device intended to be operated with a single hand, the input mechanisms, such as an audio control switch, can be placed at a location that are easily finger operated while the device is held in the palm of the hand. Other output mechanisms, such as an audio jack, can be placed at locations that do not interfere with holding the device, such as on a top edge of the device.

Device components that connect to and allow the personal media device to operate for its intended functions can be packaged within the enclosure. Some flexibility can be afforded in regards to the locations of the internal device components as long as sufficient space for needed connectors between components is available. Also, approaches, such as custom-shaped printed circuit boards (PCBs) or batteries, can be employed to allow available internal spaces to be efficiently utilized. The personal media device can include audio circuitry adapted to produce audible sound. The audible sound can be created by an acoustic device that receives and uses the audio signals to modulate a volume of air within an enclosure. In one embodiment, the audible sound can be generated by an audible sound generator enclosed within the housing. The audible sound can take the form of music provided by decoding music files retained in the personal media device. The audible sound can be actively ported through more than one opening in the housing of the personal media device. The audible sound generator can take the form of acoustic speakers having at least a diaphragm, the acoustic speakers being enclosed within an acoustic enclosure, also referred to as a speaker box. In one implementation, the openings can include a first opening in the housing used to direct at least a portion of the audible sound generated by the acoustic speakers. A second opening can be used to direct at least a remaining portion of the audible sound generated by the acoustic speakers. The second opening can be associated with a connector assembly and be referred to as a connector port.

The connector assembly used to accommodate the connector port can be widely varied. For example, the connector assembly can take the form of a data/power connector (such as a standard 30 pin type connector). The connector assembly can also be associated with an output device such as an audio jack having an audio jack barrel with a size and shape in accordance with an audio post. The audio post can be inserted into the audio jack barrel. In this way electrical contacts on the audio post engage corresponding contact pads on an interior surface of the audio jack barrel allowing electrical signals to pass between an external circuit (such as headphones) and the personal media device. Typically, when the audio post is inserted into the audio jack barrel, the acoustic speakers are disabled such that the insertion of the audio jack into the audio jack barrel does not interfere with the outputting of audible sound.

In order to enhance the listening experience, interior dimensions of the connector port/speaker assembly can be acoustically optimized for transport of sound energy. In one implementation, the housing port and the connector port can have different sizes. One of the advantages to using more than one port is that the overall audio experience can be enhanced due in part to the increase in perceived sound volume. In addition to increasing overall perceived volume, the configuration of housing port and connection port makes fully covering both the housing port and the connector port very unlikely. Therefore, a user can hold the personal media device without worrying about completely disrupting the air path from the speakers to the external environment. Furthermore, the presence of a second port reduces the overall resistance to air flow in the air-path from the speaker to the outside world resulting in a better acoustic experience.

These and other embodiments are discussed below with reference to FIGS. 1-12. However, those skilled in the art will readily appreciate that the detailed description given herein with respect to these figures is for explanatory purposes only and should not be construed as limiting.

Figure 2:
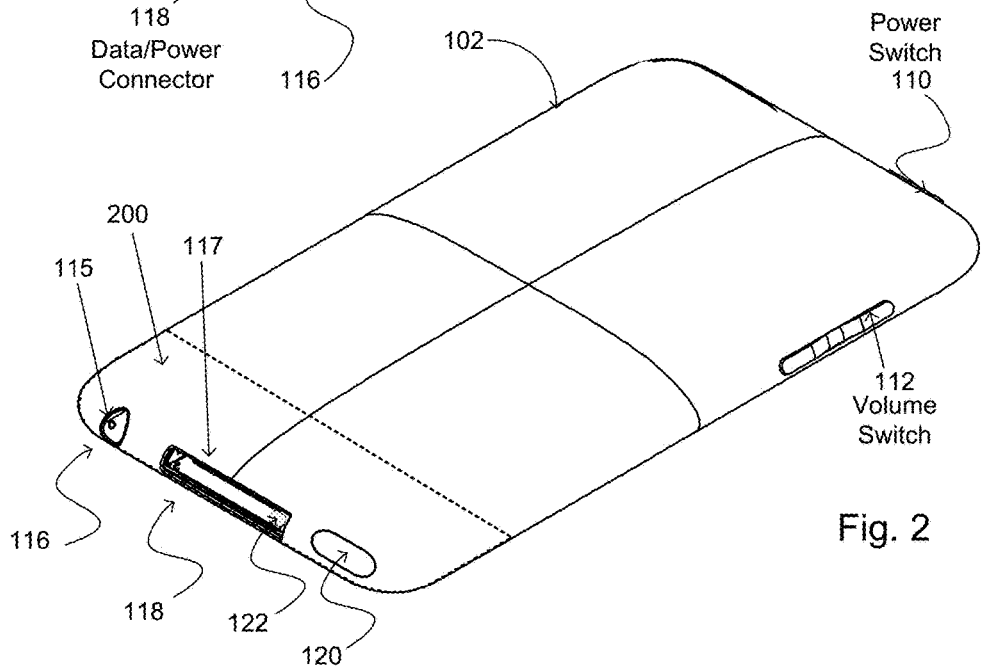

FIGS. 1-2 are perspective diagrams showing various views of fully assembled personal media device 100 in accordance with an embodiment of the invention. Personal media device 100 can be sized for one-handed operation and placement into small areas such as a pocket, i.e., personal media device 100 can be a handheld pocket sized electronic device. By way of example, personal media device 100 can correspond to a computer, media device, telecommunication device and/or the like. Personal media device 100 is capable of processing data and more particularly media such as audio. Personal media device 100 can generally correspond to a music player, game player, video player, personal digital assistant (PDA), and/or the like. With regards to being handheld, personal media device 100 can be operated solely by the user's hand(s), i.e., no reference surface such as a desktop is needed. In some cases, the handheld device is sized for placement into a pocket of the user. By being pocket sized, the user does not have to directly carry the device and therefore the device can be taken almost anywhere the user travels (e.g., the user is not limited by carrying a large, bulky and heavy device).

Personal media device 100 can be widely varied. In some embodiments, personal media device 100 can perform a single function (e.g., a device dedicated to playing and storing media) and, in other cases, the personal media device can perform multiple functions (e.g., a device that plays/stores media, receives/transmits telephone calls/text messages/internet, and/or performs web browsing). Personal media device 100 is capable of communicating wirelessly (with or without the aid of a wireless enabling accessory system) and/or via wired pathways (e.g., using traditional electrical wires). In some embodiments, personal media device 100 can be extremely portable (e.g., small form factor, thin, low profile, lightweight). Personal media device 100 can even be sized for one-handed operation and placement into small areas such as a pocket, i.e., personal media device 100 can be a handheld pocket sized electronic device. Personal media device 100 can correspond to any of those electronic devices an iPod™, or an iPhone™ available by Apple Inc. of Cupertino, Calif.

Personal media device 100 can include housing 102 configured to at least partially enclose any suitable number of components associated with personal media device 100. For example, housing 102 can enclose and support internally various electrical components (including integrated circuit chips and other circuitry) to provide computing operations for the device. The integrated circuit chips and other circuitry can include a microprocessor, memory, a battery, a circuit board, I/O, various input/output (I/O) support circuitry and the like. Although not shown in this figure, housing 102 can define a cavity within which the components can be positioned and housing 102 also can physically support any suitable number of mechanisms, within housing 102 or within openings through the surface of housing 102.

In addition to the above, housing 102 can also define at least in part the outward appearance of personal media device 100. That is, the shape and form of housing 102 can help define the overall shape and form of personal media device 100 or the contour of housing 102 can embody the outward physical appearance of personal media device 100. Any suitable shape can be used. In some embodiments, the size and shape of housing 102 can be dimensioned to fit comfortably within a user's hand. In some embodiments, the shape includes a slightly curved back surface and highly curved side surfaces. Housing 102 is integrally formed in such as way as to constitute is a single complete unit. By being integrally formed, housing 102 has a seamless appearance unlike conventional housings that include two parts that are fastened together thereby forming a reveal, a seam there between. That is, unlike conventional housings, housing 102 does not include any breaks thereby making it stronger and more aesthetically pleasing. Housing 102 can be formed of any number of materials including for example plastics, metals, ceramics and the like. In one embodiment, housing 102 can be formed of stainless steel in order to provide an aesthetic and appealing look and feel as well as provide structural integrity and support for all sub-assemblies installed therein. When metal, housing 102 can be formed using conventional collapsible core metal forming techniques well known to those skilled in the art.

Personal media device 100 also includes cover 106 that includes a planar outer surface. The outer surface can for example be flush with an edge of the housing wall that surrounds the edge of the cover. Cover 106 cooperates with housing 102 to enclose personal media device 100. Although cover 106 can be situated in a variety of ways relative to the housing, in the illustrated embodiment, cover 106 is disposed within and proximate the mouth of the cavity of housing 102. That is, cover 106 fits into an opening 108. In an alternate embodiment, cover 106 can be opaque and can include touch sensing mechanism that forms a touch pad. Cover 106 can be configured to define/carry the user interface of personal media device 100. Cover 106 can provide a viewing region for display assembly 104 used to display a graphical user interface (GUI) as well as other information to the user (e.g., text, objects, and graphics). Display assembly 104 can be part of a display unit (not shown) that is assembled and contained within housing 102. Such user input events can be used for any number of purposes, such as resetting personal media device 100, selecting between display screens presented on display assembly 104, and so on. In one embodiment, cover 106 is a protective top layer of transparent or semitransparent material (clear) such that display assembly 104 is visible there-through. That is, cover 106 serves as a window for display assembly 104 (i.e., the transparent cover overlays the display screen). In one particular embodiment, cover 106 is formed from glass (e.g., cover glass), and more particularly highly polished glass. It should be appreciated, however, that other transparent materials such as clear plastic can be used.

The viewing region can be touch sensitive for receiving one or more touch inputs that help control various aspects of what is being displayed on the display screen. In some cases, the one or more inputs can be simultaneously received (e.g., multi-touch). In these embodiments, a touch sensing layer (not shown) can be located below the cover glass 106. The touch sensing layer can for example be disposed between the cover glass 106 and the display assembly 104. In some cases, the touch sensing layer is applied to display assembly 104 while in other cases the touch sensing layer is applied to the cover glass 106. The touch sensing layer can for example be attached to the inner surface of the cover glass 106 (printed, deposited, laminated or otherwise bonded thereto). The touch sensing layer generally includes a plurality of sensors that are configured to activate as the finger touches the upper surface of the cover glass 106. In the simplest case, an electrical signal is produced each time the finger passes a sensor. The number of signals in a given time frame can indicate location, direction, speed and acceleration of the finger on the touch sensitive portion, i.e., the more signals, the more the user moved his or her finger. In most cases, the signals are monitored by an electronic interface that converts the number, combination and frequency of the signals into location, direction, speed and acceleration information. This information can then be used by the personal media device 100 to perform the desired control function relative to display assembly 104.

Personal media device 100 can also include one or more switches including power switches, volume control switches, user input devices and the like. Power switch 110 can be configured to turn personal media device 100 on and off, whereas volume switch 112 is configured to modify the volume level produced by the personal media device 100. Personal media device 100 can also include one or more connectors for transferring data and/or power to and from personal media device 100. For example, opening 115 can accommodate audio jack 116 whereas opening 117 can accommodate data/power connector 118. Audio jack 116 allows audio information to be outputted from personal media device 100 by way of a wired connector whereas connector 118 allows data to be transmitted and received to and from a host device such as a general purpose computer (e.g., desktop computer, portable computer). Connector 118 can be used to upload or down load audio, video and other image data as well as operating systems, applications and the like to and from personal media device 100. For example, connector 118 can be used to download songs and play lists, audio books, photos, and the like into the storage mechanism (memory) of personal media device 100. Connector 118 also allows power to be delivered to personal media device 100.

Portion 200 of personal media device 100 can include a number of communication features. For example, portion 200 can include at least first audio port 120 that can be used to output a first portion of audible sound generated by an audible sound generator assembly enclosed within housing 102. The audible sound generator assembly can take many forms. In the described embodiment, however, the audible sound generator assembly includes at least a diaphragm arranged to synchronously vibrate with audio signals provided by a processing unit included in personal media device 100. The audio signals can be provided by the processing unit decoding audio data files retained within personal media device 100. Enclosed within connector assembly 118, second audio port 122 can be used to output a remaining portion of the audible sound generated by the audible sound generator assembly. In this way, first audio port 120 and second audio port 122 can cooperatively output the audible sound generated by the audible sound generator assembly. By cooperative it is meant that when, for example, first audio port 120 is blocked or otherwise obstructed (by a finger, clothing, etc.), the placement of second audio port 122 substantially precludes the likelihood that second audio port 122 will also be blocked. Therefore, since first audio port 120 and second audio port 122 share an air path from the audible sound generator to the external environment, when one portion of the air path (that portion associated with first audio port 120, for example) is blocked or otherwise obstructed, at least some of the first portion of audible sound generated by the audible sound generator assembly can be passively re-directed to second audio port 122 thereby substantially preserving an overall perceived sound output level.

As an example, since connector assembly 118 can receive an external connector (such as a 30 pin connector), a substantial portion of second audio port 122 can be blocked or obscured when the connector is engaged with connector assembly 118. In this situation, it is unlikely that a user of personal media device 100 will grasp housing 102 in such as way as to obscure or block first audio port 120. Therefore, even though the engaged connector can substantially block or obscure second audio port 122, the presence of first audio port 120 helps to maintain the overall perceived audio output level by outputting at least some of the audible sound passively re-directed from second audio port 122 to first audio port 120.

Figure 3:
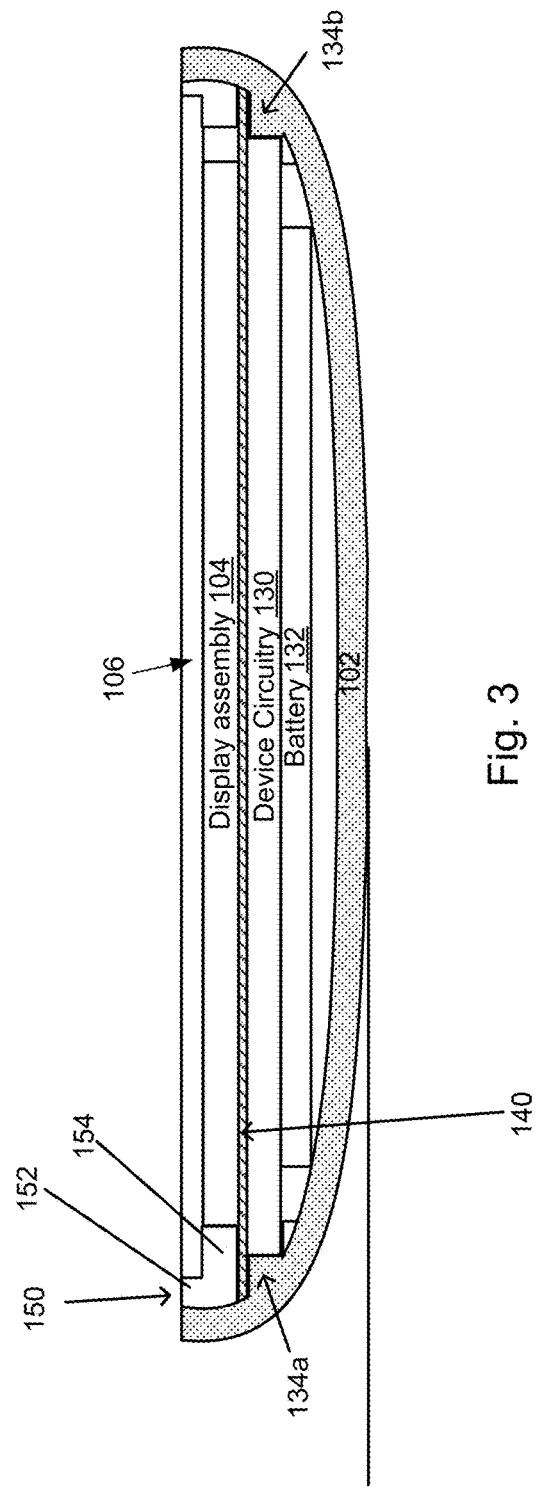
FIG. 3 shows a cross-sectional view of a portable electronic device.

FIG. 3 shows a cross-sectional view of a portable electronic device 100 shown in FIGS. 1-2. Housing 102 can enclose various internal device components such as those associated with the user interface that allow personal media device 100 to operate for its intended functions. For the purposes of discussion, the internal device components can be considered to be arranged in a number of stacked layers. For example, a display screen of the display assembly 104 can be located directly below the top glass 106. In one embodiment, the display screen and its associated display driver circuitry can be packaged together as part of the display assembly 104. Below display assembly 104, device circuitry 130, such as a main logic board or circuitry associated with other components, and a battery 132, which provides power to personal media device 100, can be located.

Internal frame 140 can add to the overall stiffness of personal media device 100 by, for example, enhancing an ability to resist bending moments experienced by housing 102. Internal frame 140 can be formed of many strong and resilient materials. For example when internal frame 140 is formed of metal such as stainless steel, internal frame 140 can be referred to as M(etal)-frame 140. M-frame 140 can provide both structural support for personal media device 100 but also act to aid in the transfer of heat generated by the various internal components to the external environment. M-frame 140 can be located below the display assembly 104 and above the device circuitry 130. In this way, M-frame 140 can provide support for various internal components as well as aid in transferring heat from internal components such as display assembly 104.

M-frame 140 can be used as an attachment point for other device components. For example, M-frame 140 can be attached to mounting surface, such as 134a and 134b, on housing 102 via fasteners or using a bonding agent. Then, other device components, such as display assembly 104 can be coupled to M-frame 140 rather than directly to housing 102. One advantage of coupling display assembly 104 to the housing via M-frame 140 is that display 140 can be somewhat isolated from bending moments associated with housing 102, i.e., bending moments generated on the housing can be dissipated into M-frame 140. Isolating the display assembly 104 from bending moments associated with housing 102 can prevent damage to display assembly 104, such as cracking, from occurring.

It should be noted that in some embodiments, personal media device 100 can include additional internal frames. For example, frame 150 can be affixed directly to housing 102 and generally may act to support top glass 106. In this regard, frame 150 can be referred to as G(lass)-frame 150. In order to support cover glass 106, G-frame 150 can include rim 152 having flange portion 154 where cover glass 106 is glued to rim 152 about flange 154, thus sealing the entire device. G-frame 150 can be made of an electrically non-conductive frame material, such as a glass filled plastic. One example glass-filled plastic suitable for use in G-frame 150 is KALIX™, manufactured by Solvay Advanced Polymers of Alpharetta, Ga. KALIX™ includes 50% glass-fiber reinforced high-performance nylon. One of ordinary skill in the art will recognize that there are many other potential frame materials that would be suitable for use with this embodiment, and the claims should not be construed as being limited to KALIX™ or any other glass-filled plastic unless expressly stated.

FIG. 4 shows an enlarged view of portion 200 of housing 102 shown in FIG. 2 viewed head on. For the remainder of this discussion and without loss of generality, first audio port 120 will be referred to as housing port 202 and second audio port 120 as connector port 204. Housing port 202 can have a size and shape in keeping with the overall shape and appearance of housing 102. For example, side walls 206 of housing 102 can have a spline, or curved shape that facilitates a user holding personal media device 100 in a hand. Accordingly, housing port 202 can be shaped to more readily blend in with the shape of sidewalls 206. Housing port 202 can be located distance "d" from rear surface 208 of housing 102. Housing port 202 can be configured in such a way that sound 210 emanating from housing port 202 can be directed at angle θ towards rear surface 208 of housing 102 as shown in FIG. 5. In this way, when personal media device 100 is placed upon supporting surface S, audible sound 210 emanating from housing port 202 can be directed at angle θ with respect to surface S resulting in at least some of audible sound 210 being directed towards supporting surface S. In this way, supporting surface S can act as a sound board such that at least a portion of audible sound 210 can reflect off of supporting surface S resulting in a more robust sounding audio presentation.

Figure 6:
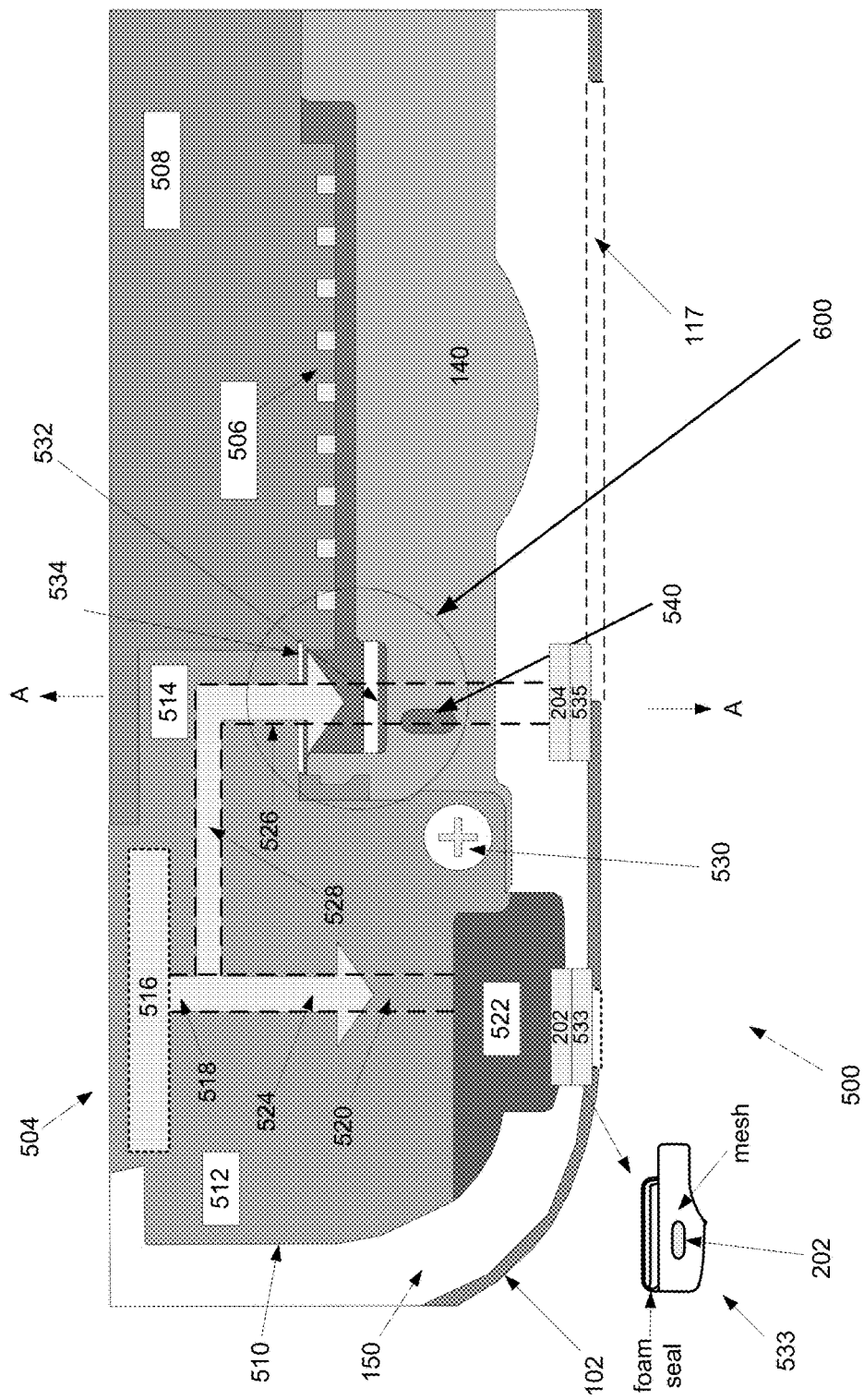
FIG. 6 shows a view of interior portion of personal media device in accordance with the described embodiments.

FIG. 6 shows a view of interior portion 500 of personal media device 100 in accordance with the described embodiments. As shown in FIG. 6, M-frame 140 can be used to provide support for various internal components such as audio sound generator assembly 504 and connector assembly 506. In the described embodiment, audio sound generator assembly 504 can be secured to housing 102 by way of G-frame 150 and M-frame 140. Connector assembly 506 can be surface mounted to printed circuit board (PCB) 508. Audio sound generator assembly 504 can include speaker box 510 having first part 512 and second part 514. First part 512 can include audio sound generator unit 516 arranged to provide audible sound 518. First part 512 can be configured to provide first air path 520. First air path 520 can acoustically couple audio sound generator unit 516 and housing port 202 by way of housing port assembly 522. In this way, first portion 524 of audible sound 518 can pass from audio sound generator unit 516 to the external environment by way of housing port assembly 522 and housing port 202 using first air path 520.

Second part 514 can be integrally formed with first part 512. Second part 514 (also referred to as a "side car" portion) can be configured to provide second air path 526. Second air path 526 can acoustically couple audio sound generator unit 516 and connector port 204 by way of connector assembly 506. In this way, second portion 528 of audible sound 518 can use second air path 526 to pass from audio sound generator unit 516 to the external environment by way of connector port 204. In order to assure a secure attachment of audio sound generator assembly 504, fastener 530 can be used. Fastener 530 can be widely varied. Fastener 530 can take the form of screw 530 that secures audio sound generator assembly 504, M-frame 140, and connector assembly 506 to housing 102.

The presence of at least two parallel air paths in the form of first air path 520 and second air path 526 has a number of advantages. One such advantage is that the presence of at least two air paths can reduce an overall resistance to air flow thereby reducing the amount of audible sound energy lost during normal operation. In this way, the audible efficiency (i.e., the perceived sound level at a given volume input level) can be substantially increased. Furthermore, by providing at least two parallel air paths along which audible sound 518 generated by audible sound generator unit 516 can travel, any increase in resistance to air flow that develops in one air path can be at least partially compensated by passive re-direction to the other air path representing the air path of lesser resistance. In this way, even if one audio output port is partially or even fully blocked, the perceived output sound level will not substantially decrease. In this way, the preservation of audio presentation provided by personal media device 100 can substantially improve user perception of the audio performance of personal media device 100.

For example, when audio sound generator unit 516 is providing audible sound 518, first portion 524 can pass to housing port 202 by way of first air path 520. Second portion 528 of audible sound 518 can concurrently pass to connector port 204 by way of second air path 526. As perceived by a user, the perceived sound levels (i.e., acoustic energy level) at housing port 202 and connector port 204 are about the same. In other words, the overall audio perception would lead the listener to conclude that audible sound 210 is in fact emanating from a single location and not at least two. However, if, for example, the user placed a finger or other object in a position to block or obscure housing port 202, then the resistance to air flow in air path 520 would increase significantly resulting in a substantial reduction in the amount of acoustic energy output at housing port 202. In this situation, the increase in resistance to air flow experienced at first air path 520 can passively cause at least some of first portion 524 to be re-directed from first air path 520 to second air path 526. In this way, even though the amount of acoustic energy output at housing port 202 is substantially reduced, the amount of acoustic energy output at connector port 204 can substantially increase due to the passive re-direction of acoustic energy from first air path 520 to second air path 526. In this way, the perceived overall audio output level (i.e., volume level) can remain substantially unchanged.

Therefore, it is clear that the overall integrity of first air path 520 and second air path 526 is important to maintaining at least some of the advantages described above especially with regards to audio efficiency, perception of audio balance between the various output ports, and the ability to preserve the overall acoustic experience. For example, any systemic increase in resistance to air flow in an air path can reduce the overall audio efficiency of audio sound generator assembly 504. For example, second air path 526 is directly connected to the external environment by way of connector port 204. In order to prevent the intrusion of dust and other debris from the external environment from degrading the quality of air path 526 (by, for example, increasing the systemic resistance to air flow due to the accumulation of debris), filter 532 can be placed between port connector 204 and second part 514. Filter 532 (shown and discussed in more detail below) can be used to prevent water and debris such as dust from contaminating second air path 526. Moreover, in the described embodiments, filter 532 can be both strong yet accessible providing for a user with the ability to periodically clean filter 532 without causing damage. Moreover, foam seal 533 and foam seal 535 can be concurrently applied to housing port 202 and connector port 204. Foam seal 533 used to air seal housing port 202 can take the form of a relatively thick layer of foam and a cosmetic mesh whereas foam seal 535 can take the form of a ring of foam using a lap joint on connector port 204.

In a particularly useful embodiment, filter 532 can take the form of cosmetic/hydrophobic mesh stack 532 that can be placed in air path 526. When placed in air path 526, cosmetic/hydrophobic mesh stack 532 can prevent moisture and dust from intruding into personal media device 100. The mesh stack 532 can include a number layers including at least a mesh layer. The mesh layer can provide a cosmetic screen that can prevent direct view of the interior of personal media device 100 from the exterior environment. Generally, the mesh portion of mesh stack 532 can be formed of a rugged and water resistant material. In some cases, the mesh material can be strong enough to provide at least some structural support for connector port 204. The strength of the cosmetic mesh can be sufficiently great to resist damage caused by, for example, the insertion of an object into the connector port.

In addition to providing protection from dust and water intrusion as well as protecting the interior of personal media device 100, the mesh remains accessible for cleaning and debris removal. The accessibility of the mesh is particularly useful since the likelihood that dust or other debris can collect at mesh stack 532 is fairly significant. Dust or other debris collecting at the mesh can be particularly irksome since contaminants, such as dust, can collect at the mesh and impede the output of audible sound thus degrading the overall performance of personal media device 100 as well as the overall user experience. The mesh can be cleaned of debris such as dust and lint by simply inserting a cleaning tool such as a damp cotton swab thereby preventing the seal from becoming clogged and reducing sound output.

Features such as air seal 534 can be used to help maintain the integrity of second air path 526. Air seal 534 can be used to seal the junction between a rear portion of connector assembly 506 and second part 514. Seal 534 can be formed of any suitably compliant material having appropriate sealant characteristics. For example, seal 534 can take the form of foam seal 534. Due to the compressible nature of foam, foam seal 534 can be compressed in place between adapter 536 of second part 514 and adapter 538 of connector assembly 506 (shown in FIG. 7). In the described embodiment, adapter 536 can be shaped in accordance with adapter 538 such that adapter 536 can be tight fitted together. In this way, adapter 536 can fit tightly within an accommodating space provided by adapter 538.

During assembly, audio sound generator unit 504 can be placed within housing 102 using a tilting action. The tilting action can cause adapter 536 to tilt into and be accommodated by adapter 538 at which point, pressure can be applied to second part 514 that can connect and secure audio sound generator unit 504 to both connector assembly 506 and PCB 508. By tilting in and applying pressure, adapter 536 can compress foam seal 534 between adapter 536 and adapter 538 causing foam seal 534 to undergo a substantial compression. In the described embodiment, adapter 538 can be shaped in such as way to accentuate the compression that foam seal 534 undergoes thereby greatly enhancing the ability of foam seal 534 to block or at least substantially inhibit the intrusion of moisture or other contaminants into air path 526. A locating pin associated with second part 514 can be used in the tilt in insertion process. The locating pin can have a shape and location configured to be inserted through an accommodating hole in PCB 508. Since PCB 508 and connector assembly 506 are soldered together during the reflow process, the locating pin can also hold second part 514 in position such that second part 514 cannot become easily separated from the connector assembly 506.

Furthermore, retention feature 540 can be used to further assure the integrity of the air seal of second air path 526. Retention feature 540 can be fitted to M-frame 140 and once in place prevents adapter 536 and adapter 538 from separating. Accordingly, M-frame 140 be placed on top of connector assembly 506 and the speaker box 510. M-frame 140 can include a finger that can fit into retention feature 540 that in one embodiment can be located on a shell portion of the connector assembly 506. M-frame 140 can also include a spring finger that can load a side of second part 514 facing the connector assembly 506. The force created by the spring finger can cause foam seal 534 to hyper-compress at the junction of adapter 534 and adapter 536. Therefore, once in place, M-frame 140 can prevent connector assembly 506 and second part 514 from separating. It should be noted that audible sound generating unit 504 can be hard mounted to the M-frame 140 and G-frame 150. This rigid mounting can help to prevent buzzing and amplifies audible sound through housing back 208 that can be accentuated when personal media device 100 is on a hard, flat surface such as desk or table.

Figure 7:
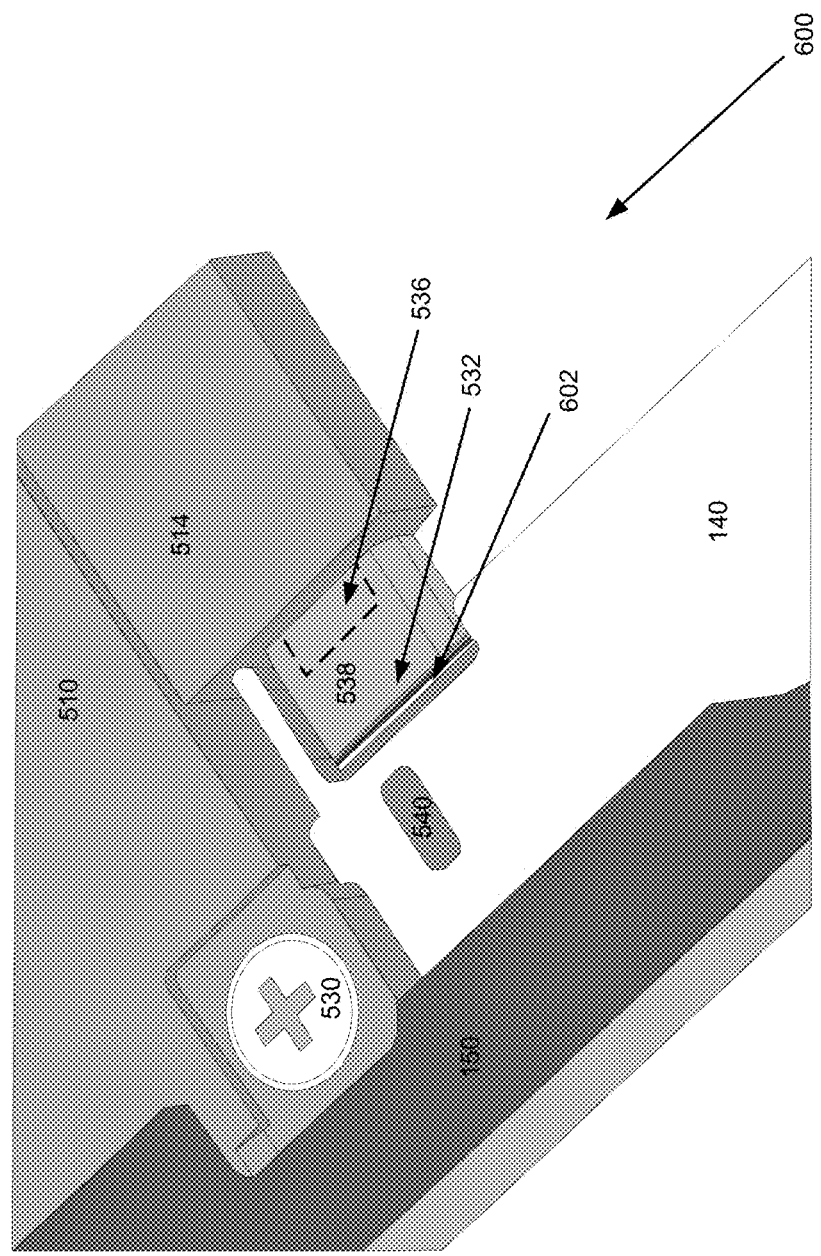
FIG. 7 shows a close up view of a portion shown in FIG. 6.

FIG. 7 shows a close up view of portion 600 shown in FIG. 6. Portion 600 provides a more detailed view of the junction of connector assembly 506 and second part 514. In particular, portion 600 shows additional details of the mesh stack of filter 532. Filter 532 can be formed of cosmetic mesh 602 used in part to prevent intrusion of water and other contaminants such as dust from entering degrading second air path 526. During assembly of personal media device 100, connector assembly 506 is mounted and attached to PCB 508 using a surface mount technique referred to as solder reflow, or more simply, reflow. During the reflow process, molten solder is used to electrically connect various components onto electrical pads and traces that are part of PCB 508. Due to the harsh conditions (including high temperature), filter 532 cannot survive the reflow process used to surface mount connector assembly 506 to printed circuit board 508, and therefore, filter 532 cannot be an integral part of connector assembly 506. Therefore, filter 532 can be installed after connector assembly 506 has been surface mounted to PCB 508 using what can be referred to as a "portcullis" (i.e., a sliding gate) assembly technique. As with a sliding gate, filter 532 can be dropped into place during assembly using slots, or grooves. Once in place, filter 532 can be sealed in place using an adhesive such as glue. In this way, the filter 532 can be sealed against environmental contaminants from entering the interior of the personal media device.

Figure 8:
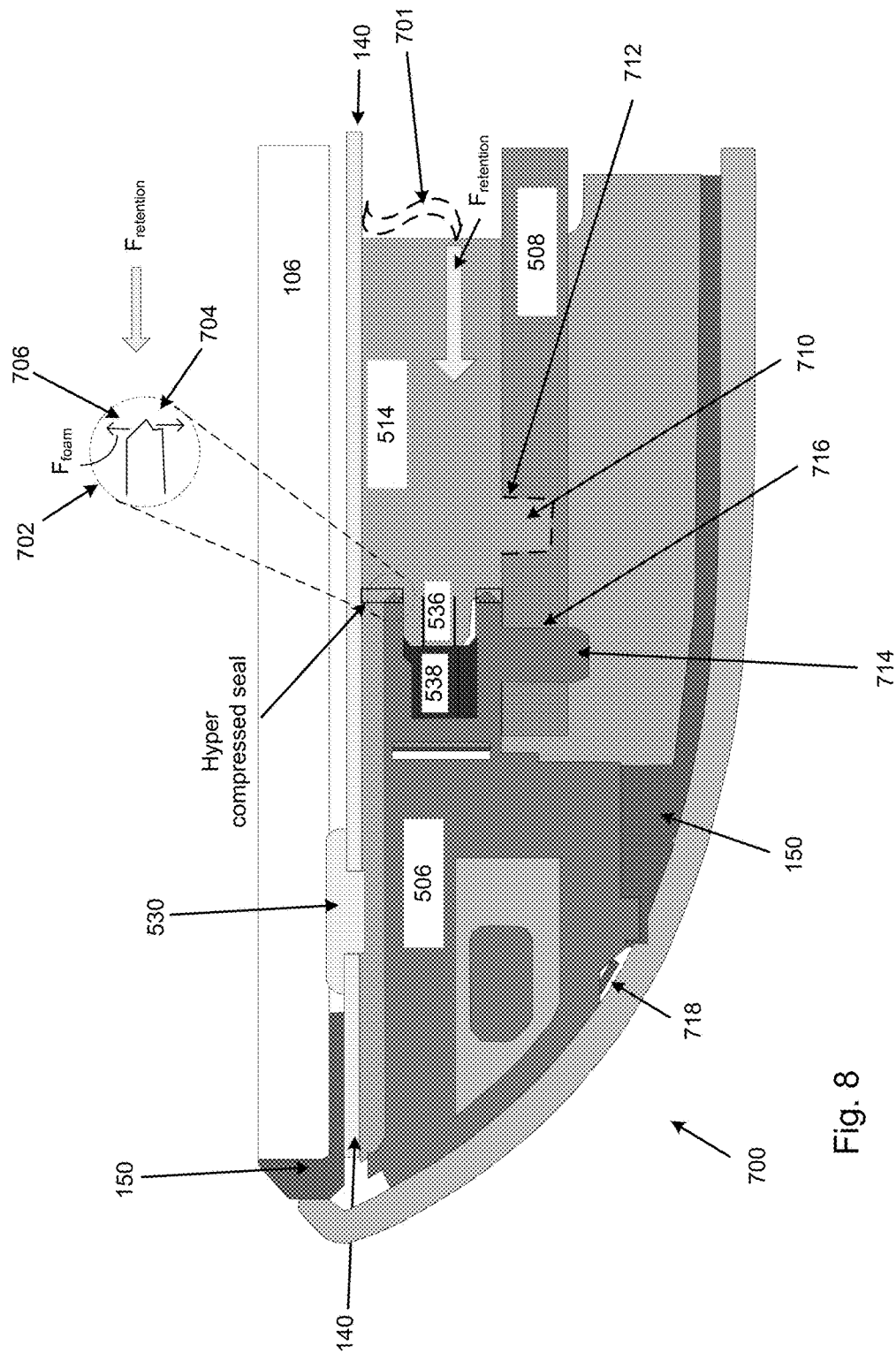
FIG. 8 shows a cross sectional view along line A-A of FIG. 6.

FIG. 8 shows a cross sectional view 700 along line A-A of FIG. 6. Cross sectional view 700 shows a relationship between the sealing capability of foam seal 534 and adapter 536 and adapter 538. In particular, retention spring 701 can be used to apply retention force $F_{retention}$ directly onto second part 514. Retention force $F_{retention}$ can, in turn, cause adapter 536 to impinge directly onto "spear" shaped portion 702 of adapter 538. In this way, chamfered surfaces 704 and 706 of spear portion 702 can direct components of retention force $F_{retention}$ (shown as foam force $F_{foam}$) to "hyper-compress" portion 708 of foam seal 534 against M-frame 150 thereby substantially increasing the sealing capability of foam seal 534. Audible sound generating unit 504 can include alignment pin 710 having a size and shape in accordance with PCB opening 712. During the assembly of personal media device 100, connector assembly 506 can be secured to PCB 508 using connector alignment pin 714 into PCB opening 716. Seal 718 can be used to enhance the seal and therefore reduce the likelihood of sound leaks.

Figure 9:
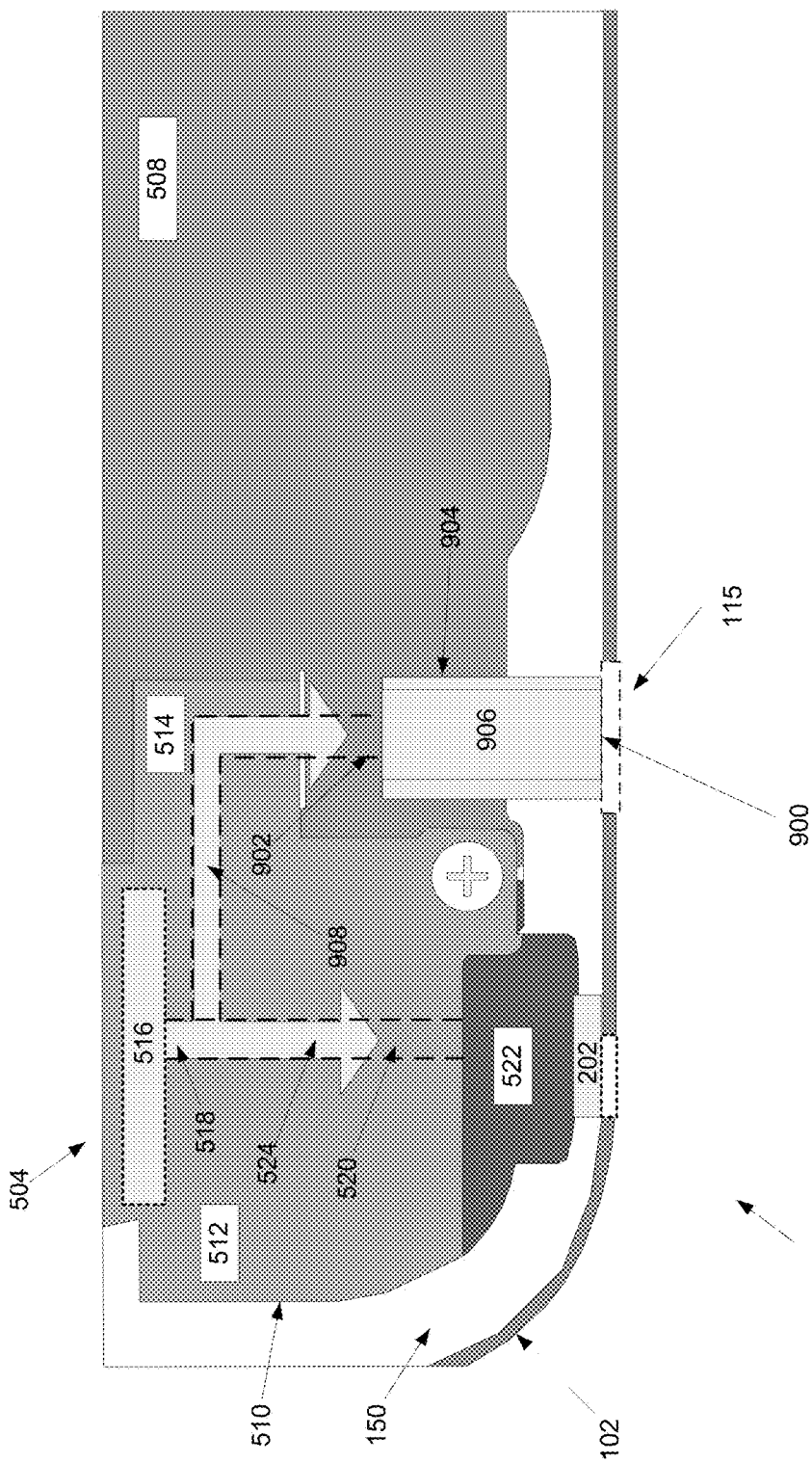
FIG. 9 shows another embodiment where an audio jack is used to port audible sound.

FIG. 9 shows another embodiment where in place of, or in addition to, connector port 204, audio jack port 900 can be used to output audio sound generated by audible sound generator unit 516 using audio jack air path 902. Audio jack air path 902 can acoustically connect audible sound generator unit 516 to audio jack unit 904. In particular, second part 514 can be connected to audio jack unit 904 at, for example, audio jack barrel 906. In this way, when not occupied by an audio jack post, portion 908 of audible sound 518 can emanate from audio jack port 900. It should be noted, that when the audio jack post is inserted into audio jack barrel 906, audible sound generator unit 516 is typically disabled and therefore presents no conflict with any potential audible sound emanating from audio jack port 900.

Figure 10:
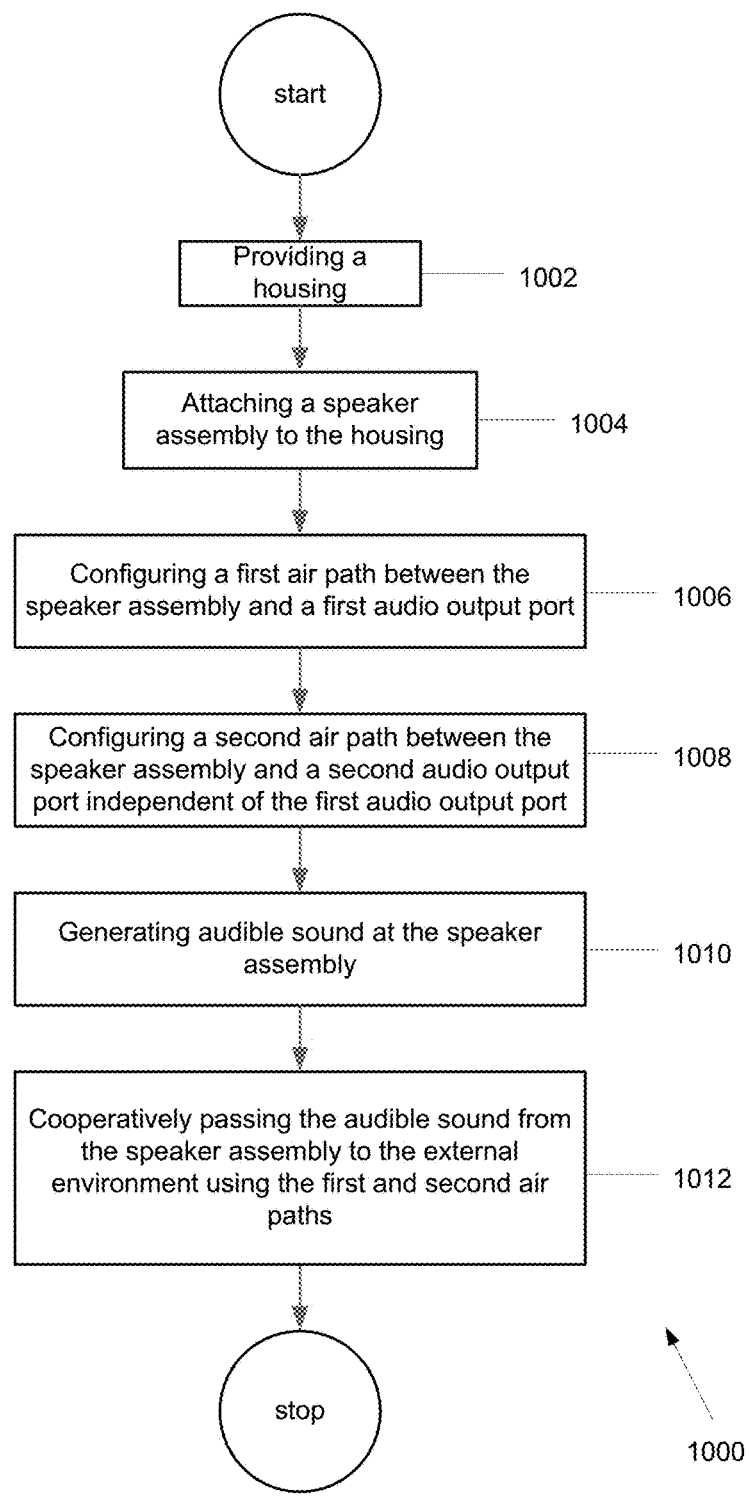
FIG. 10 details a flow chart describing a process in accordance with the described embodiments.

FIG. 10 shows a flowchart detailing process 1000 in accordance with the described embodiments. Process 1000 can begin at 1002 by providing a housing for enclosing a plurality of operational components used to provide functionality for a personal media device. The housing can be formed of metal such as stainless steel or aluminum and have a seamless uni-body construction. The housing can include a number of openings each having a size and shape to accommodate an input/output device, switch, connector and so forth. Next at 1004, a speaker assembly can be attached to an interior of the housing. The speaker assembly can take many forms. In the described embodiments, the speaker assembly includes an acoustic speaker formed of, for example, a diaphragm that vibrates in accordance with electrical signals provided by an audio circuit that decodes audio files retained in the personal media device. Next at 1006, a first air path is configured. The first air path acoustically couples the speaker assembly to the external environment by way of a first audio output port. In the described embodiment, the first audio output port can take the form of an opening in the housing. Next at 1008, a second air path is configured between the speaker assembly and a second audio output port independent of the first audio output port. By independent it is meant that the first audio output port and the second audio output port can be physically located such that one or the other of the ports can be blocked by an object such as a user's finger but not both. In this way, at least one of the audio ports can remain substantially unblocked at all times.

At 1010, audible sound is generated by the speaker assembly. At 1012, the audible sound is cooperatively passed from the speaker assembly to the external environment using the first and the second audio ports. By cooperatively passing it is meant that the first air path and the second air path are linked such that an increase in resistance to the transfer of acoustic energy in one air path results in a passive redirection of at least some of the acoustic energy from the air path of higher resistance to the air path of the lower resistance. For example, if the first audio output port is blocked or at least obscured resulting in an increase in resistance to the flow of acoustic energy in the first air path, then at least some of the otherwise blocked acoustic energy is re-directed to the second air path. In this way, the perceived audio output level by the personal media device remains substantially unchanged.

Figure 11:
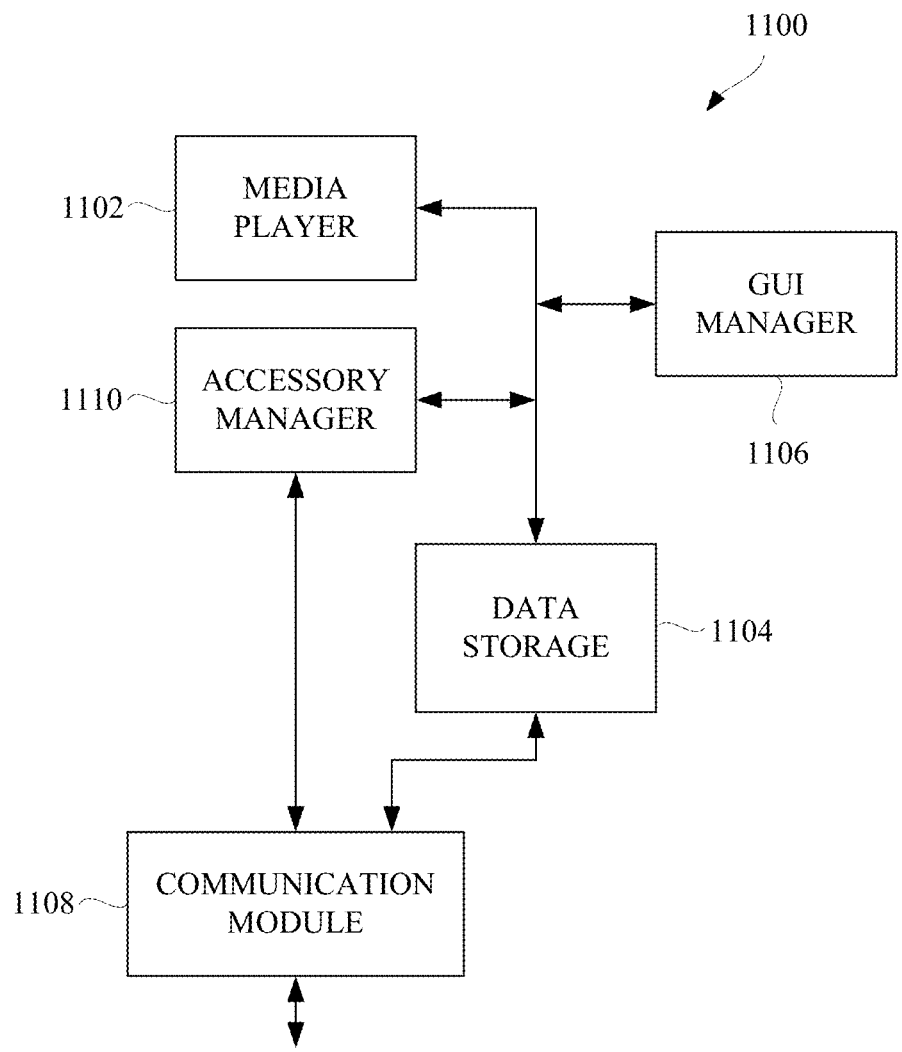
FIG. 11 is a block diagram of an arrangement of functional modules utilized by a portable media device.

FIG. 11 is a block diagram of an arrangement 1100 of functional modules utilized by a portable media device. The portable media device can, for example, be portable media device 102 illustrated in FIGS. 1 and 2. The arrangement 1100 includes a media player 1102 that is able to output media for a user of the portable media device but also store and retrieve data with respect to data storage 1104. The arrangement 1100 also includes a graphical user interface (GUI) manager 1106. The GUI manager 1106 operates to control information being provided to and displayed on a display device. The arrangement 1100 also includes a communication module 1108 that facilitates communication between the portable media device and an accessory device. Still further, the arrangement 1100 includes an accessory manager 1110 that operates to authenticate and acquire data from an accessory device that may be coupled to the portable media device. For example, the accessory device can be a wireless interface accessory, such as the wireless interface accessory 106 illustrated in FIG. 1 as being coupled to portable media device 102.

Figure 12:
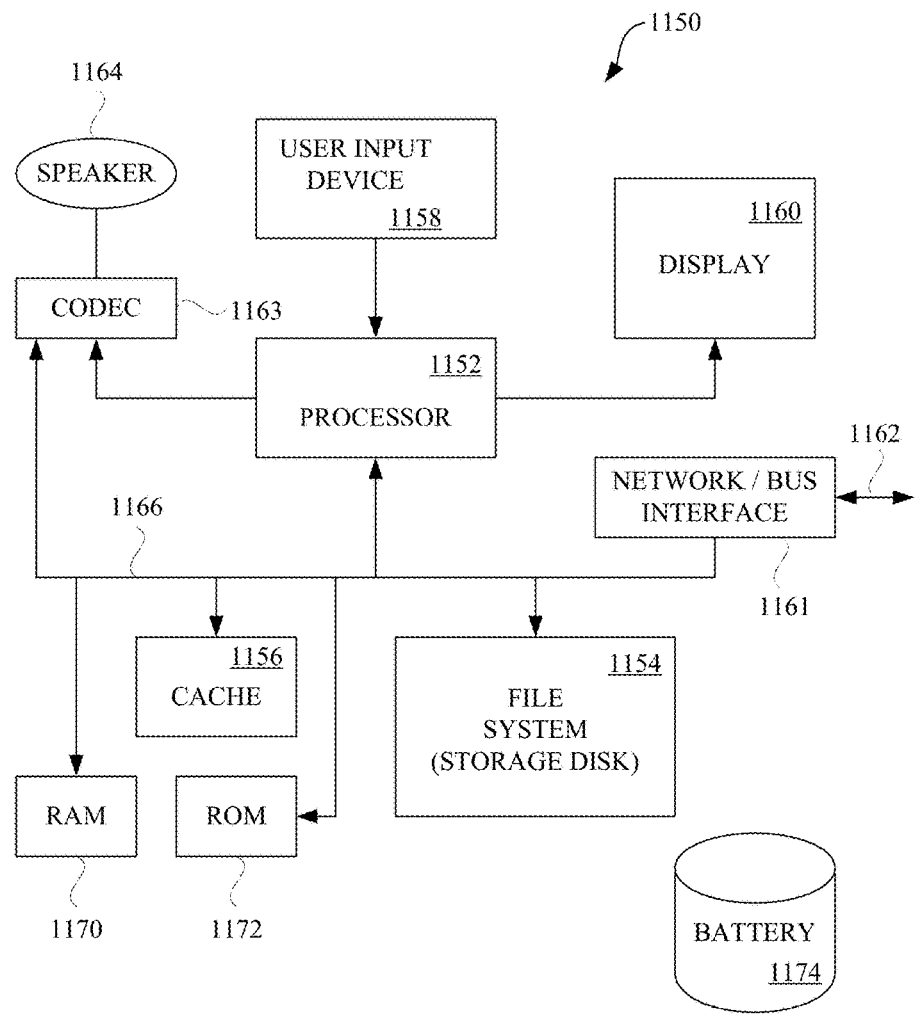
FIG. 12 is a block diagram of a media player suitable for use with the described embodiments.

FIG. 12 is a block diagram of a media player 1150 suitable for use with the described embodiments. The media player 1150 illustrates circuitry of a representative portable media device. The media player 1150 includes a processor 1152 that pertains to a microprocessor or controller for controlling the overall operation of the media player 1150. The media player 1150 stores media data pertaining to media items in a file system 1154 and a cache 1156. The file system 1154 is, typically, a storage disk or a plurality of disks. The file system 1154 typically provides high capacity storage capability for the media player 1150. However, since the access time to the file system 1154 is relatively slow, the media player 1150 can also include a cache 1156. The cache 1156 is, for example, Random-Access Memory (RAM) provided by semiconductor memory. The relative access time to the cache 1156 is substantially shorter than for the file system 1154. However, the cache 1156 does not have the large storage capacity of the file system 1154. Further, the file system 1154, when active, consumes more power than does the cache 1156. The power consumption is often a concern when the media player 1150 is a portable media device that is powered by a battery 1174. The media player 1150 can also include a RAM 1170 and a Read-Only Memory (ROM) 1172. The ROM 1172 can store programs, utilities or processes to be executed in a non-volatile manner. The RAM 1170 provides volatile data storage, such as for the cache 1156.

The media player 1150 also includes a user input device 1158 that allows a user of the media player 1150 to interact with the media player 1150. For example, the user input device 1158 can take a variety of forms, such as a button, keypad, dial, touch screen, audio input interface, video/image capture input interface, input in the form of sensor data, etc. Still further, the media player 1150 includes a display 1160 (screen display) that can be controlled by the processor 1152 to display information to the user. A data bus 1166 can facilitate data transfer between at least the file system 1154, the cache 1156, the processor 1152, and the CODEC 1163.

In one embodiment, the media player 1150 serves to store a plurality of media items (e.g., songs, podcasts, etc.) in the file system 1154. When a user desires to have the media player play a particular media item, a list of available media items is displayed on the display 1160. Then, using the user input device 1158, a user can select one of the available media items. The processor 1152, upon receiving a selection of a particular media item, supplies the media data (e.g., audio file) for the particular media item to a coder/decoder (CODEC) 1163. The CODEC 1163 then produces analog output signals for a speaker 1164. The speaker 1164 can be a speaker internal to the media player 1150 or external to the media player 1150. For example, headphones or earphones that connect to the media player 1150 would be considered an external speaker.

The media player 1150 also includes a network/bus interface 1161 that couples to a data link 1162. The data link 1162 allows the media player 1150 to couple to a host computer or to accessory devices. The data link 1162 can be provided over a wired connection or a wireless connection. In the case of a wireless connection, the network/bus interface 1161 can include a wireless transceiver. The media items (media assets) can pertain to one or more different types of media content. In one embodiment, the media items are audio tracks (e.g., songs, audio books, and podcasts). In another embodiment, the media items are images (e.g., photos). However, in other embodiments, the media items can be any combination of audio, graphical or video content.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A personal media device, comprising:
   a display;
   a housing enclosing an audio generator, the housing comprising:
     a back surface opposite the display;
     a sidewall coupled to the back surface;
     a first port defined by the sidewall and extending through an exterior surface of the sidewall, the first port being arranged to facilitate broadcast of a first portion of sound generated by the audio generator; and
     a second port defined by the sidewall and positioned adjacent to the first port, the second port used to broadcast a second portion of the sound generated by the audio generator and to receive a connector plug,
   wherein when the second port is blocked, at least some of the second portion of the sound is re-directed to the first port.

2. The personal media device as recited in claim 1, wherein the second port remains substantially unseen by a user during normal operation of the personal media device.

3. The personal media device as recited in claim 1, wherein the connector plug is a data connector plug.

4. The personal media device as recited in claim 3, wherein the second port comprises electrical contacts configured to interact with a plurality of pins of the data connector plug.

5. The personal media device as recited in claim 1, wherein the second port comprises a headphone jack.

6. The personal media device as recited in claim 1, wherein when the first port is blocked, at least some of the first portion of the sound is re-directed to the second port.

7. A method, comprising:
   forming a housing with a size and shape suitable for enclosing operational components of a personal media device;
   attaching a speaker assembly to an interior of the housing;
   positioning a compressible seal between the housing and the speaker assembly;
   defining a first air path by acoustically coupling the speaker assembly to an external environment via a first audio port that extends through an exterior surface of the housing;
   defining a second air path between the speaker assembly and a second audio port proximate to the first audio port, the second audio port, the second audio port being configured to receive a connector plug; and
   passively re-directing at least some of the sound from the first air path to the second air path in response to an increase in resistance to the passage of sound along the first air path.

8. The method as recited in claim 7, further comprising:
   passively re-directing at least some of the sound from the second air path to the first air path in response to the data connector plug substantially blocking the second audio port such that an overall perception of audio output level remains substantially unchanged.

9. The method as recited in claim 7, wherein the increasing the resistance to the passage of sound at the first air path comprises blocking the first audio port with an object.

10. The method as recited in claim 7, wherein the second audio port has a size and shape to accommodate a data connector.

11. The method as recited in claim 7, wherein the second audio output port has a size and shape to accommodate an audio post.

12. The method as recited in claim 11, further comprising:
inserting the audio post into the second audio output port; and
disabling the speaker assembly.

13. An integrated sound output system incorporated in a personal media device, the personal media device having at least a processor, an audio circuit, and a data retention unit, comprising:
- a sound generator unit at least partially sealed to the personal media device by a compressible seal, the sound generator unit arranged to produce sound in response to audio data retrieved from the data retention unit, decoded by the audio circuit, and processed by the processor;
- a speaker port acoustically coupled with the sound generator unit by way of a first air path, the speaker port extending through an exterior surface of the personal media device; and
- a data connector port configured to receive a data connector plug and acoustically coupled with the sound generator unit by way of a second air path, wherein the first and the second air paths cooperate to pass the sound generated by the sound generator unit to the external environment by way of the speaker port and the data connector port.

14. The integrated sound generator unit as recited in claim 13, wherein when the data connector port is blocked, a portion of the sound generated by the sound generator unit is redirected from the second air path to the first air path prevented from passing from the sound generator unit to the external environment by way of the data connector port.

15. The integrated sound generator unit as recited in claim 14, wherein when the speaker port is blocked at least some of the sound generated by the sound generator unit is passively re-directed to the first air path that remains substantially unblocked such that an overall perception of audio output level of the personal media device remains substantially unchanged.

* * * * *

UNITED STATES PATENT AND TRADEMARK OFFICE
CERTIFICATE OF CORRECTION

PATENT NO. : 9,602,914 B2
APPLICATION NO. : 12/950793
DATED : March 21, 2017
INVENTOR(S) : Anna-Katrina Shedletsky et al.

Page 1 of 1

It is certified that error appears in the above-identified patent and that said Letters Patent is hereby corrected as shown below:

Column 16, Line 53 Claim 7: Delete "the second audio port,".

Signed and Sealed this
Seventeenth Day of April, 2018

Andrei Iancu
*Director of the United States Patent and Trademark Office*